Patented Oct. 6, 1942

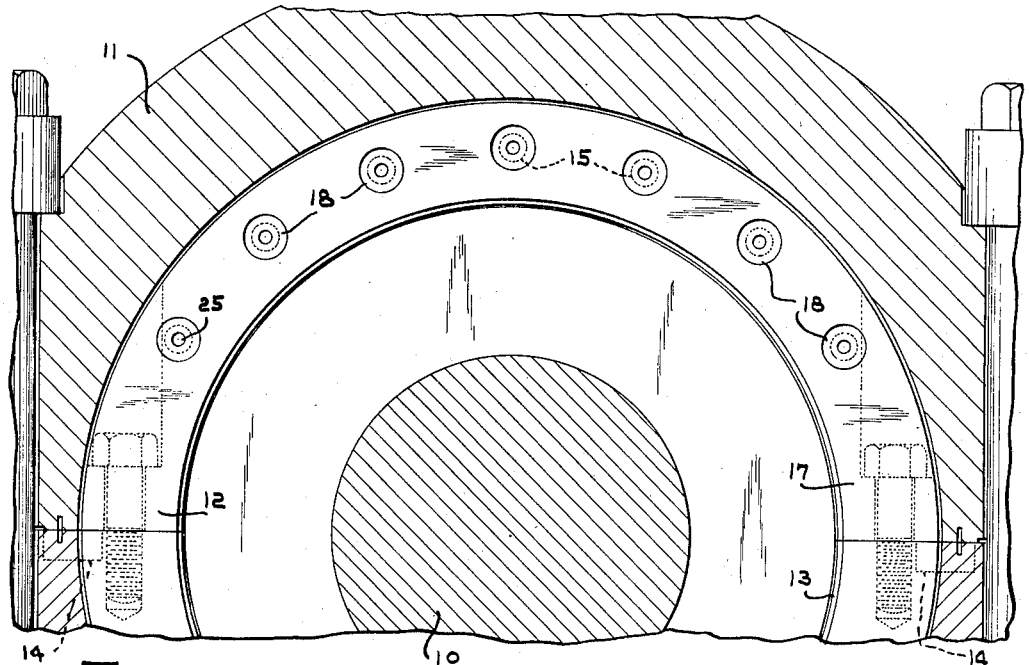
Fig. 2.
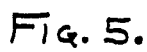
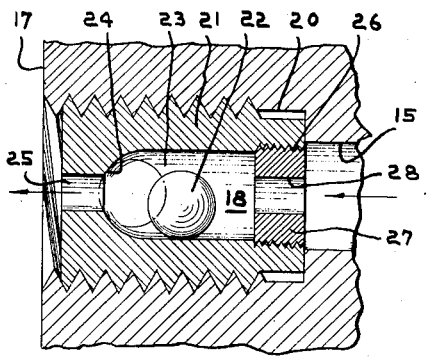
Fig. 3.
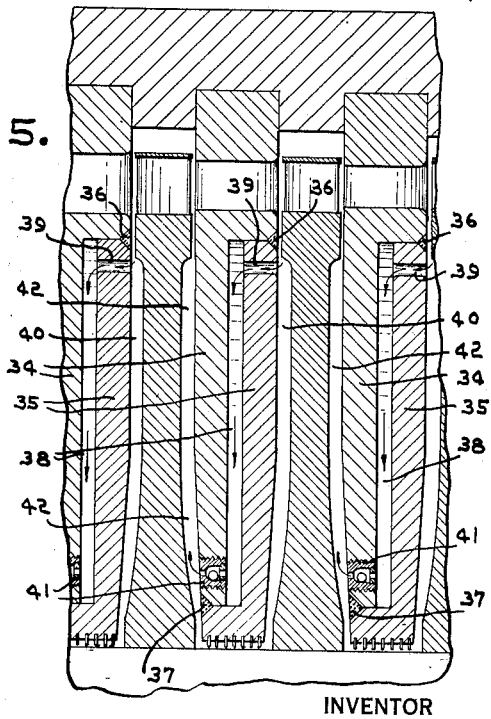
Fig. 5.
INVENTOR
ERIC A. ZETTERQUIST.

2,297,853

UNITED STATES PATENT OFFICE 2,297,853

HEATING STEAM TURBINE

Eric A. Zetterquist, Drexel Hill, Pa., assignor to Westinghouse Electric & Manufacturing Company, East Pittsburgh, Pa., a corporation of Pennsylvania Application August 7, 1941, Serial No. 405,754

4 Claims. (Cl. 253—69)

The invention relates to elastic fluid turbines and the like equipped with rings, such as dummy and blade rings, or diaphragms, generally referred to herein as ring members, and it has for an object to provide for rapid heating and slow cooling of the ring members to insure increased clearance in the seals incident to starting and stopping the turbine.

A more particular object of the invention is to provide a ring member of the character indicated with passages connecting opposite sides thereof together with check valves for opening and closing the passages.

These and other objects are effected by the invention as will be apparent from the following description and claims taken in connection with the accompanying drawings, forming a part of this application, in which:

Fig. 2 is a transverse sectional view taken along the line II—II of Fig. 1;

Fig. 3 is a detail view of one of the passage check valves;

Fig. 4 is a view showing a modified type of dummy ring and blade ring; and,

Fig. 5 is a sectional detail view showing the invention applied to a turbine diaphragm.

Figure 1:
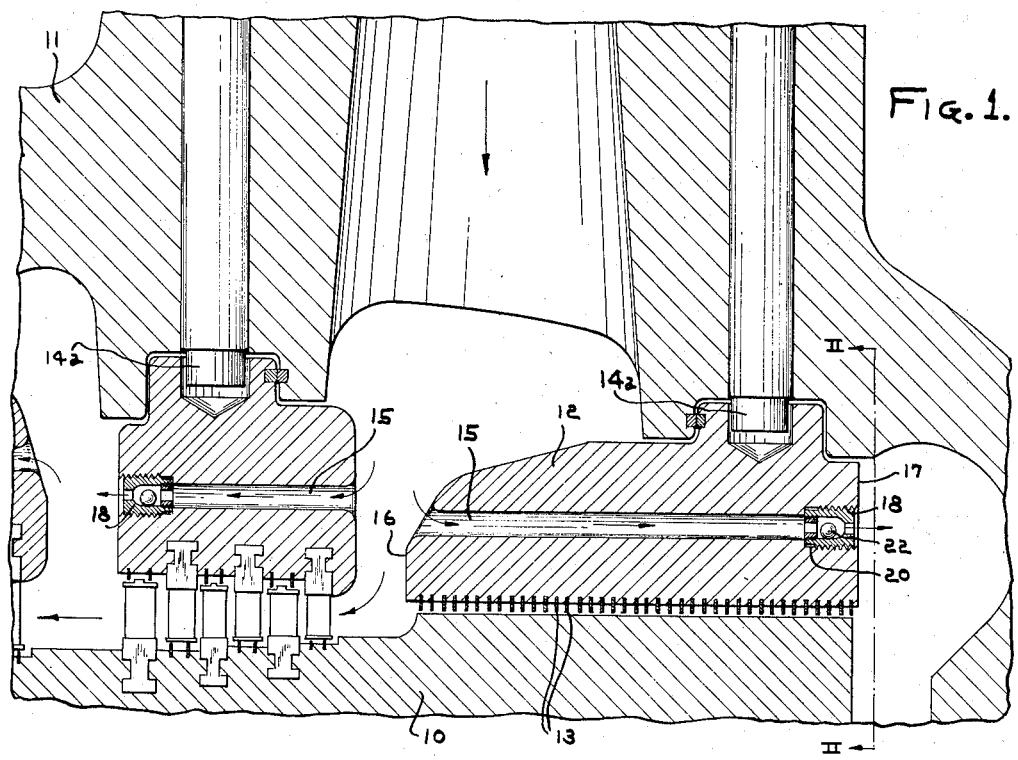
Fig. 1 is a longitudinal sectional view showing the invention applied to a turbine dummy ring and turbine blade ring.

In the drawings, there is shown a turbine including a spindle 10 and a cylinder 11. In Figs. 1 to 4, inclusive, the cylinder 11 supports a dummy ring 12 encompassing the spindle 10, sealing rings 13 of the usual type being arranged between the dummy ring and the spindle. The dummy ring is supported from the cylinder by any suitable means, such as the lugs 14 and the tenons 14a permitting of expansion and contraction of the ring member radially relative to the cylinder and the spindle while maintaining it coaxial with the spindle.

To provide for rapid heating and slow cooling of the ring member 12, the latter has a plurality of passages 15 extending from the side 16 of higher pressure to the side 17 of lower pressure, each passage having a check valve, at 18, associated therewith and arranged to close the passage when the pressure differential at opposite sides of the ring member becomes sufficiently large and to open the passage when such differential becomes sufficiently small.

Preferably, as shown in Fig. 3, each passage 15 is preferably enlarged or counterbored as shown at 20 for the reception of a cage 21 of the check valve, at 18, and within which is arranged the ball check valve 22, the cage or body 21 having a check valve chamber 23 formed to provide a valve seat 24 about the discharge passage 25. Preferably, the body has a threaded opening 26 large enough to permit of insertion and removal of the ball valve 22; and, after the latter is in place, the opening 26 is closed by means of a tubular plug 27 providing an entrance passage 28 connecting the main passage 15 and the valve chamber 23.

With the arrangement of structure so far described, it will be apparent that, as long as the pressure differential between the sides 16 and 17 of the ring 12 is below a predetermined amount, the ball valves 22 will not interrupt the passages 15 and the latter are effective to permit the flow of steam. When starting the turbine, the passages 15 are, of course, open and steam flows therethrough, thereby bringing about rapid heating of the structure of the ring 12 and providing for expansion thereof relative to the spindle, thereby causing increased clearance in the sealing rings and avoiding any damage to the latter. With increased admission of steam to the turbine, the pressure differential increases until the latter is sufficient to bring about closing of the check valves. For example, the arrangement may be such that as long as the turbine operates at the no-load condition, the valves will be open and as soon as the load is increased the valves will close. In addition to the arrangement providing for rapid heating of the ring member incident to starting, as just pointed out, it also provides for slow cooling thereof incident to shutting down of the turbine. Just as soon as the admission of steam is decreased to the no-load condition, the valves open, permitting of free flow of steam through the passages 15, whereby the heating effect of steam so flowing retards cooling of the ring member and thereby prevents contraction of the latter relative to the spindle and possible consequent damage to the sealing rings.

In Fig. 4, there is shown a modified form of dummy ring consisting of inner and outer parts 30 and 31 connected together by the welds 32, the inner and outer parts being formed to provide the annular chamber 33. Passages 15a connect the high-pressure end 16 of the ring member to the chamber 33 and larger passages 20a for the check valve cages 21 provide for connection of the chamber with the low-pressure end 17 of the ring.

In Fig. 5, the invention is shown as applied to a turbine diaphragm. Preferably, the diaphragm comprises complementary parts 34 and 35 connected by welds 36 and 37, the parts cooperating to provide a chamber 38. A plurality of passages 39 afford communication between the high-pressure side 40 of the diaphragm and the chamber and the passages 41 provide communication between the chamber and the low-pressure side 42, the passages 41 accommodating check valves, as already described.

From the foregoing, it will be apparent that I have devised a relatively simple means readily embodied in a turbine ring member and providing for rapid heating and slow cooling thereof, thereby avoiding damage to sealing rings and the like incident to expansion of the spindle in relation to the ring member or contraction of the latter in relation to the spindle. Thus, in starting, steam may flow through the passages, thereby bringing about rapid heating of the ring member and radial expansion thereof away from the spindle to increase the clearance and avoid the possiblity of damage to the sealing rings. On the other hand, on shutting down the turbine, continued flow of steam through the passages retards cooling of the ring member with the result that contraction thereof in relation to the spindle and possible damage to the sealing rings are avoided. It will be apparent that the invention is applicable to any suitable turbine ring member such as a dummy ring, a blade ring, or a diaphragm.

While I have shown the invention in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a turbine, a spindle, a ring member encompassing the spindle, and means providing for rapid heating and slow cooling of the ring member, said means comprising passages formed in the ring member and extending through opposite sides of the latter and means responsive to the pressure difference at opposite sides of the ring member for opening and closing the passages.

2. In a turbine, a spindle, a ring member encompassing the spindle, and means providing for rapid heating and slow cooling of the ring member, said means comprising passages formed in the ring member and extending through opposite sides of the latter and check valves for the passages, said check valves operating when the pressure differential across the ring member is sufficiently large to close the passages and when the differential is sufficiently small to open the passages.

3. In a turbine, a cylinder of a spindle, a ring member within the cylinder and encompassing the spindle, means for supporting the ring member from the cylinder, said means providing for expansion and contraction of the ring member relative to the cylinder and the spindle, sealing means between the ring member and the spindle, and means providing for rapid heating and slow cooling of the ring member, the last-named means including passages formed in the ring member and extending through opposite sides of the latter and means responsive to the pressure difference at opposite sides of the ring member for opening and closing the passages.

4. In a turbine, a cylinder of a spindle, a ring member within the cylinder and encompassing the spindle, means for supporting the ring member from the cylinder, said means providing for expansion and contraction of the ring member relative to the cylinder and the spindle, sealing means between the ring member and the spindle, and means providing for rapid heating and cooling of the ring member, the last-named means including passages formed in the ring member and extending through opposite sides of the latter and check valves for the passages, said check valves operating when the pressure differential across the ring member is sufficiently large to close the passages and when the pressure differential is sufficiently small to open the passages.

ERIC A. ZETTERQUIST.